US008055406B2

(12) United States Patent
Murakami

(10) Patent No.: US 8,055,406 B2
(45) Date of Patent: Nov. 8, 2011

(54) HANDS-FREE SYSTEM, NAVIGATION SYSTEM, AND TERMINAL MEMORY DATA MANAGEMENT METHOD

(75) Inventor: Fumitada Murakami, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 413 days.

(21) Appl. No.: 12/427,167

(22) Filed: Apr. 21, 2009

(65) Prior Publication Data

US 2009/0265100 A1    Oct. 22, 2009

(30) Foreign Application Priority Data

Apr. 22, 2008  (JP) ................. 2008-111789

(51) Int. Cl.
*H04M 9/00*        (2006.01)
(52) U.S. Cl. .............. 701/36; 455/569.1; 455/551
(58) Field of Classification Search ............... 701/1, 36, 701/200; 455/551, 569.1; 379/420.01
See application file for complete search history.

(56) References Cited

U.S. PATENT DOCUMENTS

| | | | |
|---|---|---|---|
| 6,336,038 B1 | 1/2002 | Nojima et al. | |
| 7,031,659 B2 * | 4/2006 | Tomoda et al. | 455/41.2 |
| 7,363,061 B2 | 4/2008 | Kakehi | |
| 7,783,328 B2 * | 8/2010 | Iwase | 455/569.1 |
| 2007/0082705 A1 * | 4/2007 | Jain et al. | 455/558 |

FOREIGN PATENT DOCUMENTS

| | | |
|---|---|---|
| JP | 3185734 | 8/1991 |
| JP | 2001016300 | 1/2001 |
| JP | 3185734 B2 | 5/2001 |
| JP | 2005354268 | 12/2005 |
| JP | 2006060293 | 3/2006 |
| JP | 2007266755 | 10/2007 |

* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A hands-free system that permits access to terminal memory data when a mobile terminal is identified through identification information is equipped with a storage portion that stores therein terminal memory data in association with first identification information and second identification information, a receiving portion that receives first identification information and second identification information from the mobile terminal, a collation portion that collates the received first identification information and the stored first identification information with each other and collates the received second identification information and the stored second identification information with each other, and a terminal memory data deletion portion that deletes the terminal memory data stored in association with the second identification information when it is determined that collation by the first identification information is impossible and that collation by the second identification information is possible.

17 Claims, 8 Drawing Sheets

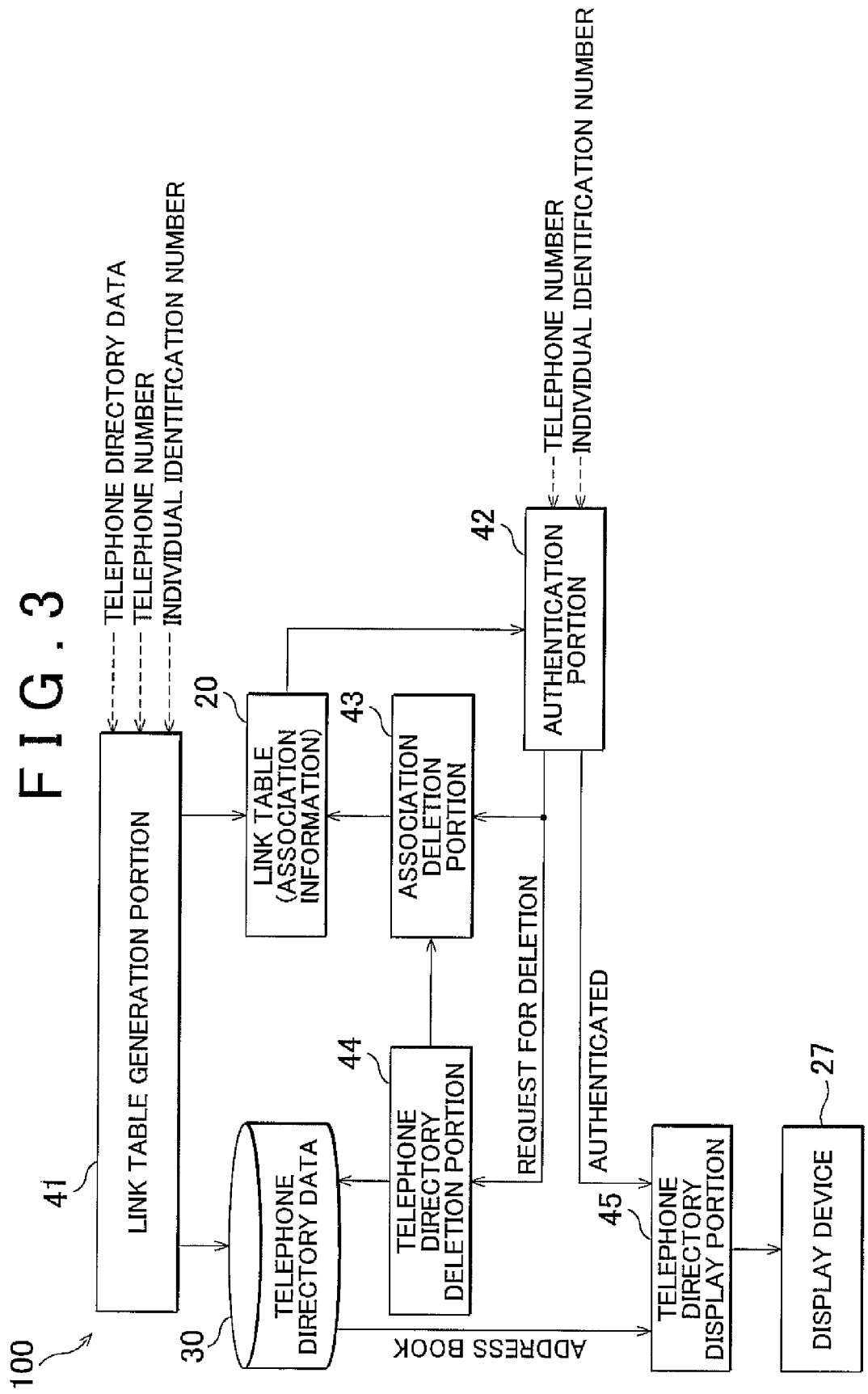

FIG. 4A

| TELEPHONE NUMBER: 090-1234-5678 | INDIVIDUAL IDENTIFICATION NUMBER: 123 |
|---|---|
| TELEPHONE DIRECTORY A ||

FIG. 4B

| TELEPHONE NUMBER: 090-1234-5678 | INDIVIDUAL IDENTIFICATION NUMBER: 123 |
|---|---|
| – ||

FIG. 4C

MOBILE TELEPHONE 12A:
| TELEPHONE NUMBER: 090-1234-5678 | INDIVIDUAL IDENTIFICATION NUMBER: 123 |
|---|---|
| TELEPHONE DIRECTORY A ||

MOBILE TELEPHONE 12Z:
| TELEPHONE NUMBER: 070-1111-2222 | INDIVIDUAL IDENTIFICATION NUMBER: 890 |
|---|---|
| TELEPHONE DIRECTORY Z ||

FIG. 4D

MOBILE TELEPHONE 12A:
| TELEPHONE NUMBER: 090-1234-5678 | INDIVIDUAL IDENTIFICATION NUMBER: 123 |
|---|---|
| – ||

MOBILE TELEPHONE 12Z:
| TELEPHONE NUMBER: 070-1111-2222 | INDIVIDUAL IDENTIFICATION NUMBER: 890 |
|---|---|
| TELEPHONE DIRECTORY Z ||

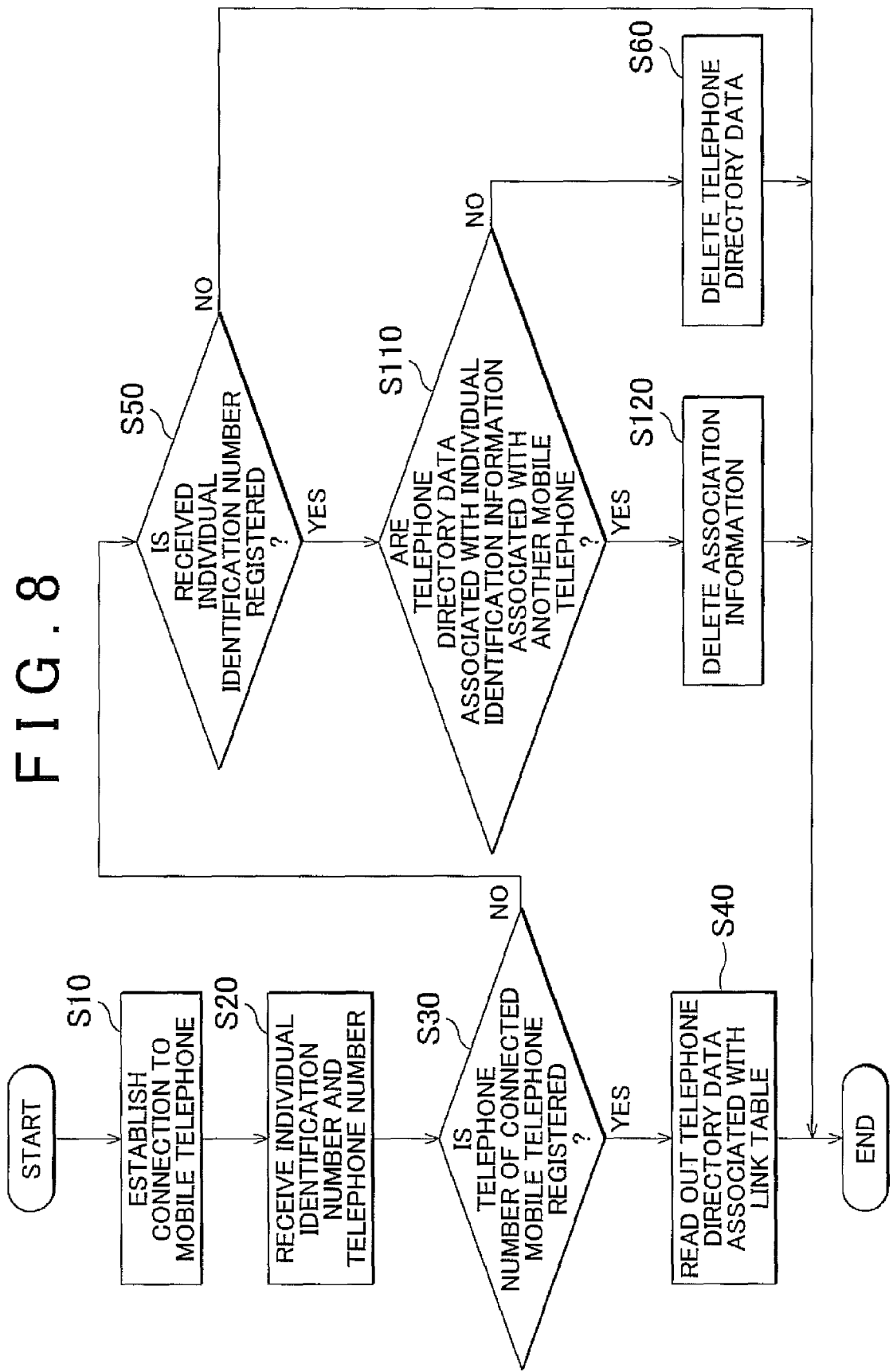

HANDS-FREE SYSTEM, NAVIGATION SYSTEM, AND TERMINAL MEMORY DATA MANAGEMENT METHOD

INCORPORATION BY REFERENCE

The disclosure of Japanese Patent Application No. 2008-111789 filed on Apr. 22, 2008 including the specification, drawings and abstract is incorporated herein by reference in its entirety.

BACKGROUND OF THE INVENTION

1. Field of the Invention

The invention relates to a hands-free system for managing access to terminal memory data transferred from a mobile terminal and stored, a navigation system, and a terminal memory data management method.

2. Description of the Related Art

Telephone directory data on a telephone directory, which are stored in a mobile telephone carried by a user, a personal handyphone system (PHS) in Japan (hereinafter referred to simply as a mobile telephone), or the like, may be transferred to a vehicular information terminal such as a navigation device or the like. For example, the mobile telephone and the vehicular information terminal may be connected to each other with or without a wire, and the telephone directory may be transferred when the user operates the mobile telephone. After the telephone directory is transferred, when the user displays the telephone directory stored in the vehicular information terminal and selects a person or company to call (a telephone number), the person or company can be called via the mobile telephone through, for example, a hands-free function.

For example, in Japanese Patent Application Publication No. 2007-266755 (JP-A-2007-266755), there is disclosed a transmission control device that has stored in telephone directory data each telephone number and each mobile telephone to be used in association with each other and thereby determines that one of a plurality of mobile telephones which is to be used to make a call in accordance with a telephone number of a transmission destination when the plurality of the mobile telephones are connected to a vehicular information terminal. Thus, even when there is a plurality of passengers carrying mobile telephones, each of the passengers can call a desired person or company through, for example, the hands-free function without selecting that one of the mobile telephones which is actually to be used, only by selecting the person or company to be called (the telephone number).

However, if the telephone directory is stored in the vehicular information terminal, a family member, a friend, or someone else (hereinafter referred to simply as another person) can browse the telephone directory after getting into the vehicle. Thus, for example, Japanese Patent Application Publication No. 2005-354268 (JP-A-2005-354268), describes a vehicular information terminal that generates a link key based on the mobile telephone ID and an ID number of the vehicular information terminal and stores therein telephone directory data in association with the link key. Thus, even if another person that has entered the vehicle has a mobile telephone, that person is prevented from browsing the telephone directory data if the generated link key is different. It is therefore possible to prevent the other person from browsing the telephone directory data.

By the same token, for example, Japanese Patent Publication No. 3185734 (JP-B2-3185734), there is proposed a vehicular information terminal that locks telephone directory data when a passenger carrying a mobile telephone with an unregistered mobile telephone ID gets into a vehicle, from the standpoint of restraining someone else from browsing the telephone directory data.

However, if browsing of the telephone directory data is simply forbidden, as in the case of the vehicular information terminal s described in Japanese Patent Application Publication No. 2005-354268 (JP-A-2005-354268) or Japanese Patent Publication No. 3185734 (JP-B2-3185734), someone else may browse the telephone directory data by doing something dishonest.

Incidentally, each passenger may change his or her mobile telephone hand set for a new one (change the model of his or her mobile telephone). However, in the vehicular information terminal s described in Japanese Patent Application Publication No. 2005-354268 (JP-A-2005-354268) and Japanese Patent Publication No. 3185734 (JP-B2-3185734), the mobile telephone ID of the new handset differs from the previous handset, and it may become impossible to access the registered telephone directory data. Further, in this case, if the telephone directory data remain stored in the vehicular information terminal, the memory of the vehicular information terminal is occupied.

SUMMARY OF THE INVENTION

The invention provides a hands-free system, a navigation system, and a telephone directory data management method that reinforce the security of information in an vehicular information terminal associated with a mobile telephone, make it possible to use telephone directory data before the replacement of a model of the mobile telephone even after the replacement thereof, and restrain a memory from being occupied.

A hands-free system according to the first aspect of the invention is a hands-free system that stores therein terminal memory data transferred from a storage memory of a mobile terminal and permits access to the terminal memory data when the mobile terminal is identified through predetermined identification information. This hands-free system is equipped with a storage portion that stores therein the terminal memory data stored in the memory of the mobile terminal in association with first identification information and second identification information, a receiving portion that receives the first identification information and the second identification information from the mobile terminal, a collation portion that collates first received identification information as the first identification information that has been received and first stored identification information as the first identification information stored in the storage portion with each other and collates second received identification information as the second identification information that has been received and second stored identification information as the second identification information stored in the storage portion with each other, and a terminal memory data deletion portion that deletes the terminal memory data stored in association with the second stored identification information when it is determined that the first received identification information and the first stored identification information cannot be collated with each other and that the second received identification information and the second stored identification information can be collated with each other.

According to the invention, because the terminal memory data are deleted, security may be reliably ensured, and the capacity for the memory can be reduced. Further, the replacement of the mobile telephone handset may be coped with by setting the telephone number as the first identification information.

A hands-free system according to a second aspect of the invention is a hands-free system that stores therein terminal memory data transferred from a mobile terminal and permits access to the terminal memory data when the mobile terminal is identified through predetermined identification information. This hands-free system is equipped with a storage portion that stores therein the terminal memory data stored in the memory of the mobile terminal in association with first identification information and second identification information, a receiving portion that receives first identification information and second identification information from the mobile terminal, a collation portion that that collates first received identification information as the first identification information that has been received and first stored identification information as the first identification information stored in the storage portion with each other and collates second received identification information as the second identification information that has been received and second stored identification information as the second identification information stored in the storage portion with each other, and a terminal memory data deletion portion that deletes the terminal memory data associated with the first stored identification information and the second stored identification information when it is determined that the first received identification information and the first stored identification information cannot be collated with each other and that the second received identification information and the second stored identification information can be collated with each other.

A navigation system according to a third aspect of the invention is equipped with the hands-free system according to each of the foregoing aspects of the invention, a position detection portion that detects position information on a vehicle, and a display portion that displays a position of the vehicle on a road map.

A memory data management method according to a fourth aspect of the invention is a terminal memory data management method in a hands-free system that stores therein terminal memory data transferred from a mobile terminal and permits access to the terminal memory data when the mobile terminal is identified through predetermined identification information. This terminal memory data management method includes storing in advance into a storage portion of the hands-free system the terminal memory data stored in a memory of the mobile terminal in association with first identification information and second identification information, receiving first identification information and second identification information from the mobile telephone by a receiving portion of the hands-free system, collating first received identification information as the first identification information that has been received and first stored identification information as the first identification information stored in the storage portion with each other and collating second received identification information as the second identification information that has been received and second stored identification information as the second identification information stored in the storage portion with each other by a collation portion of the hands-free system, and deleting the terminal memory data associated with the first stored identification information and the second stored identification information by a terminal memory data deletion portion of the hands-free system when it is determined that the collation portion cannot collate the first received identification information and the first stored identification information with each other and that the collation portion can collate the second received identification information and the second stored identification information can be collated with each other.

According to the invention, it is possible to provide a hands-free system, a navigation system, and a terminal memory data management method that reinforce the security of information in a vehicular information terminal associated with a mobile telephone, make it possible to use terminal memory data before the replacement of a model of the mobile telephone even after the changing thereof, and restrain a memory from being occupied.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is an example of a functional block diagram of the vehicular information terminal according to the second embodiment of the invention;

FIGS. 4A to 4D are diagrams each showing an example of a link table according to the second embodiment of the invention;

FIG. 8 is a flowchart showing the process by which a vehicular information terminal according to the third embodiment of the invention authenticates a mobile telephone.

DETAILED DESCRIPTION OF EMBODIMENTS

Figure 1:
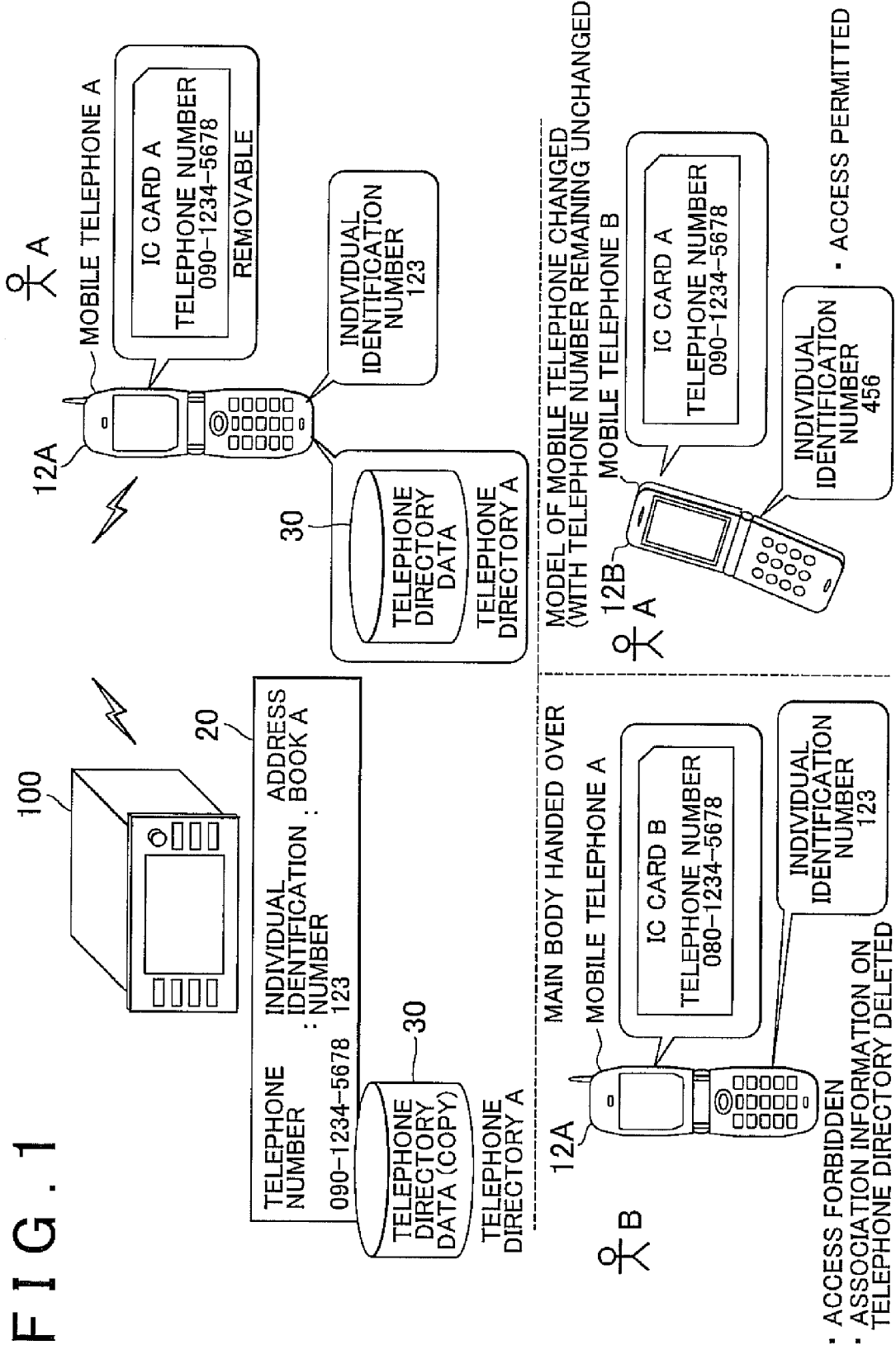
FIG. 1 is a diagram the schematically illustrates identification of mobile telephones by a vehicular information terminal according to the first embodiment of the invention.

The first embodiment of the invention will be described hereinafter with reference to the drawings. FIG. 1 is a diagram for schematically illustrating identification of a mobile telephone 12 by a vehicular information terminal 100 according to the first embodiment of the invention. It should be noted that the user is the person carrying the mobile telephone 12 and is a passenger on or the driver of a vehicle equipped with the vehicular information terminal 100. Further, the mobile telephone 12 may include a personal handyphone system (PHS), a personal data assistant (PDA) fitted with a communication unit such as a PHS card, or a personal computer.

The telephone number of a mobile telephone 12A is often stored in an IC card that may be removed from the mobile telephone 12A (hereinafter referred to as the mobile telephone 12 when no distinction is made among mobile telephones). In addition, in this embodiment of the invention, it is assumed that the telephone number is stored in this IC card. By storing a telephone number into the IC card, only the replacement of the IC card is required in changing the model of the mobile telephone 12 or selectively using two mobile telephones 12. Therefore, a user A can may continue to use a single telephone number even after changing the model of the mobile telephone 12 or the like.

Further, an individual identification number is stored in the mobile telephone 12A. The individual identification number includes identification information, such as a, globally uniquely identify the mobile telephone 12A. The individual identification number cannot be changed once it has been stored in the mobile telephone 12A at the time of the manufacturing thereof. Further, this number cannot be removed from the mobile telephone 12A or replaced with another number.

User A, the owner of the mobile telephone 12A, may transfer telephone directory data 30 of a telephone directory "A" stored in the mobile telephone 12A to the vehicular information terminal 100 mounted on the vehicle on which the user A is aboard. Then, the vehicular information terminal 100 has stored therein a link table 20 that associates the telephone number and the individual identification number, which have been received from the mobile telephone 12A, with the telephone directory data 30 on the telephone directory "A".

The vehicular information terminal 100 authenticates the mobile telephone 12A on the basis of the telephone number received from the mobile telephone 12, and permits access to the telephone directory data 30 on the telephone directory "A" when the mobile telephone 12A is authenticated. A concrete situation will be described hereinafter as an example. First of all, the example will be described with reference to a diagram on the upper right of FIG. 1. When the user A possesses the mobile telephone 12A, the vehicular information terminal 100 receives a telephone number and an individual identification number from the mobile telephone 12A carried by the user A, and refers to the link table 20 based on the received telephone number. In this case, the telephone number "090-1234-5678" is registered in the link table 20. Therefore, the mobile telephone 12A is authenticated, and the vehicular information terminal 100 permits access to the telephone directory data 30 on the telephone directory "A".

Next, a case where the user A changes the model of the mobile telephone from the mobile telephone 12A to the mobile telephone 12B will be described with reference to, for example, a diagram on the lower right of FIG. 1. The user A may change the model of the mobile telephone from the mobile telephone 12A to the mobile telephone 12B. In changing the model, the user A simply removes the IC card from the mobile telephone 12A and reinserts it into the mobile telephone 12B without changing the telephone number. The vehicular information terminal 100 receives the telephone number and the individual identification number from the mobile telephone 12B carried by user A, and refers to the link table 20 based on the received telephone number. In this case, the telephone number "090-1234-5678" is coincident. Therefore, the mobile telephone 12B is authenticated, and the vehicular information terminal 100 permits access to the telephone directory data 30 on the telephone directory "A".

Accordingly, by authenticating the mobile telephone 12B through the telephone number, user A may access the telephone directory data 30 on the registered telephone directory even after having changed the model of the mobile telephone (changing to a new handset). The user A is not required to perform an operation of transferring the telephone directory data 30 on the telephone directory "A" to the vehicular information terminal 100 again. As a result, an improvement in convenience can be made.

Next, a case where the user A has handed over the mobile telephone 12A to a user B will be described with reference to an example shown on the lower left of FIG. 1. The user A may hand over the mobile telephone 12A to a family member or a friend (hereinafter referred to as the user B). In this case, if the user A also gives the telephone number to the user B, acquaintances and the like of the user A call the user B. Therefore, the user A withdraws an IC card A and hands over only the main body of the mobile phone 12A. The user B, to whom the main body of the mobile telephone 12A has been handed over, makes a contract with a business proprietor of the mobile telephone 12A and fits an IC card B acquired through the contract into the mobile telephone 12A. Accordingly, the telephone number of the mobile telephone 12A is different from the telephone number at the time of storage of the telephone directory data 30 on the telephone directory "A" into the vehicular information terminal 100.

When the user B gets into the vehicle, the vehicular information terminal 100 receives a telephone number and an individual identification number from the mobile telephone 12A carried by the user B, and refers to the link table 20 based on the received telephone number. In this case, the telephone number "090-1234-5678" in the link table 20 does not coincide with the received telephone number "080-1234-5678". Therefore, the mobile telephone 12A is not authenticated. When the mobile telephone 12A is not authenticated, the vehicular information terminal 100 forbids access to the telephone directory data 30 on the telephone directory "A".

Further, when the mobile telephone 12A is not authenticated, the vehicular information terminal 100 refers to the link table 20 based on the received individual identification number. The individual identification number in the link table 20 coincides with the received individual identification number of the mobile telephone 12A. Therefore, assuming that the mobile telephone 12A has been handed over to the user B, the vehicular information terminal 100 deletes from the link table 20 association information associating the mobile telephone 12A with the telephone directory data 30 in the telephone directory "A". Accordingly, even if only the individual identification numbers coincide with each other, the user B cannot access the telephone directory data 30 on the telephone directory "A". As a result, security can be ensured. Further, if the telephone directory data 30 are not deleted, it is possible to associate the telephone directory data 30 on the telephone directory "A" with the mobile telephone 12B, used by user A when the user A gets into the vehicle at a later date.

The telephone directory data 30 in the telephone directory "A" may be deleted instead of deleting association information from the link table 20. If the telephone directory data 30 are deleted, the memory capacity of the vehicular information terminal 100 can be saved.

Accordingly, by authenticating the mobile telephone 12A through the telephone number, the security of the telephone directory "A" may be ensured even when user B gets into the vehicle carrying the mobile telephone 12A. If the telephone directory data 30 in the telephone directory "A" are deleted, a further improvement in security can be made, and the capacity of the memory can be saved.

Figure 2:
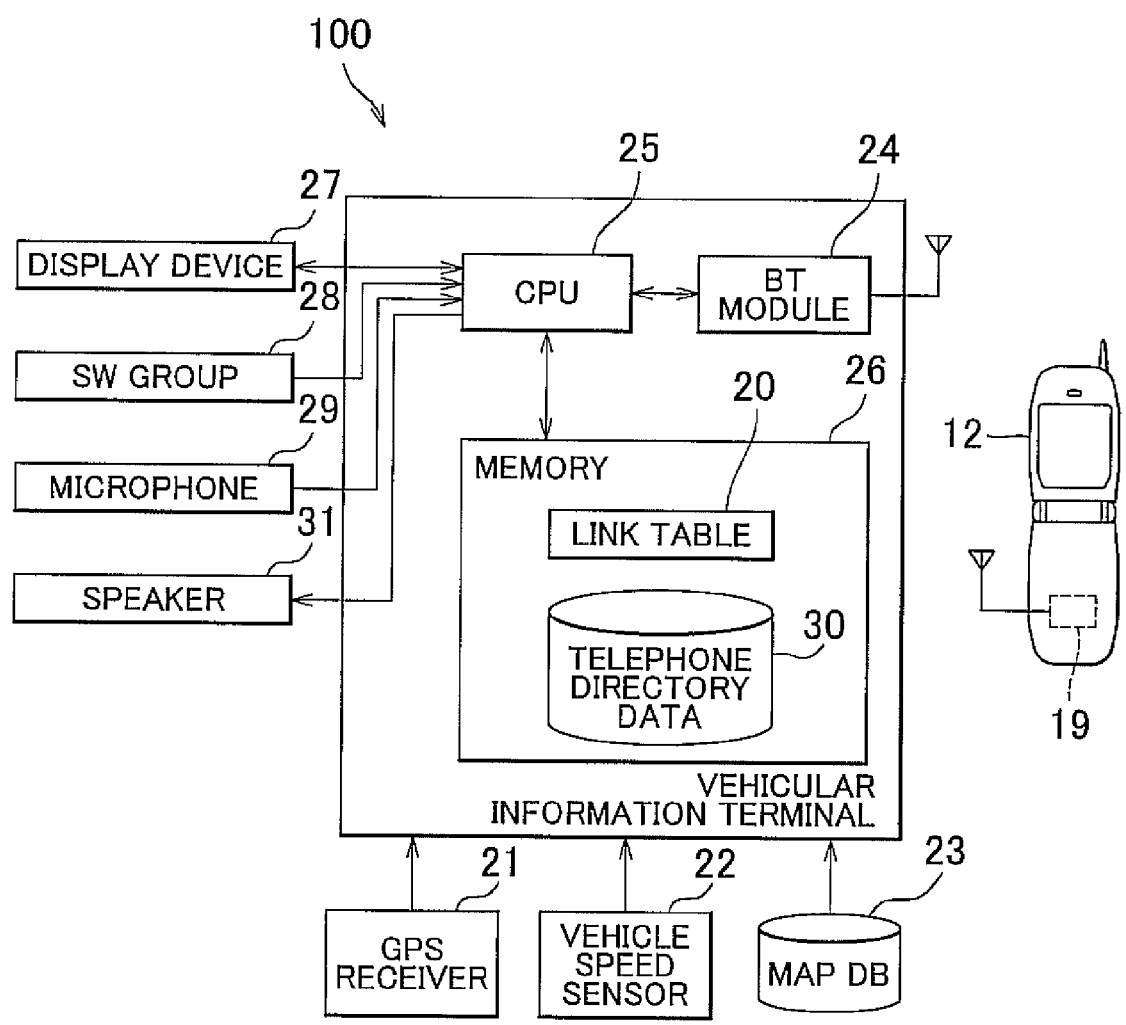
FIG. 2 is an example of a schematic configuration of a vehicular information terminal according to the second embodiment of the invention.

FIG. 2 shows an example of a schematic configurational diagram of the vehicular information terminal 100 according to the second embodiment of the invention. The vehicular information terminal 100 is controlled by a CPU 25. A display 27, a switch group (hereinafter referred to as SW group) 28, a microphone 29, a speaker 31, a memory 26, and a Bluetooth™ module (hereinafter referred to as BT module) 24 are connected to the CPU 25.

The memory 26 is a non-volatile memory such as a flash memory, a hard disk drive, or the like. The aforementioned link table 20 and the telephone directory data 30 on the telephone directory "A" are stored in the memory 26.

The mobile telephone 12 and the vehicular information terminal 100 are connected to each other with or without a wire, and enable hands-free communication. In this embodiment of the invention, the mobile telephone 12 and the vehicular information terminal 100 communicate with each other, utilizing the Bluetooth™ communication standard.

The display device 27 may be a liquid-crystal display, an organic EL display, a head-up display, or the like, and is used to display telephone numbers, names of persons to be called, designations of companies to be called, or the like in the telephone directory "A". The display device 27 has therearound a keyboard-type operation portion for operating the vehicular information terminal 100, and is equipped with a touch panel for acquiring operation information from a contact position of the user.

The SW group 28 is composed of an on-hook SW for a telephone circuit, an off-hook SW for off-hook, and a talk SW for speech recognition. When the off-hook SW is depressed, the vehicular information terminal 100 shifts to a telephone mode, and the display device 27 displays a telephone screen for telephone control. A numeric keypad for inputting telephone numbers is displayed on the telephone screen. When the mobile telephone 12 is authenticated, telephone directory "A" is also displayed on the telephone screen. Telephone directory "A" includes names, telephone numbers, and the like of stored (registered) persons or companies. Therefore, by selectively operating the name or telephone number on the telephone screen (touching a touch panel, operating a cursor displayed by the operation portion, etc.), a person or company to be called is selected and then called by the mobile telephone 12.

On-hook and/or off-hook may be carried out through acoustic operation based on speech recognition instead of operating the SW group 28. In this case, the user does not need to touch the SW group 28. Therefore, complete hands-free operation can be realized.

When a call arrives at the mobile telephone 12 with the telephone directory data 30 on the telephone directory "A" recorded, the vehicular information terminal 100 collates a telephone number of a transmission source with the telephone directory data 30 on the telephone directory "A". If the telephone number of the transmission source is recorded directory "A", the name of the transmission source read out from the telephone directory data 30 on the telephone directory "A" is displayed on a screen indicating that the call has arrived. When the telephone number of the transmission source is not recorded, the telephone number of the transmission source is displayed. When the user hooks off the SW group 28 for the arriving call, communication is made possible.

The user's speech is collected by the microphone 29 and converted into an electric signal. The BT module 24 then sends the speech information to the mobile telephone 12. The mobile telephone 12 is also equipped with a BT module 19, and sends the received speech information to a destination in a predetermined format. Further, the BT module 19 of the mobile telephone 12 sends speech information from the destination to the BT module 24 of the vehicular information terminal 100. The CPU 25 converts the speech information into an electric signal and outputs the electric signal from the speaker 31.

Communication through BT will be described. In BT, synchronous connection oriented (SCO) connection and an asynchronous connectionless link (ACL) are defined. SCO connection is a line connection-type point-to-point link formed with the BT modules 24, 19, and is mainly used to transfer speech data. Further, ACL connection is a link for establishing packet switching-type connection, and is mainly used to send data.

Unique ID's are assigned to the BT modules 24, 19 respectively. In establishing connection, persons or companies to communicate with are identified with the aid of these ID's. In first connecting the BT modules 24, 19, it is necessary to input a PIN key (code number). When the correct PIN key is input, paring is thereby completed. After that, communication is made possible simply when both the modules approach each other in their activated (energized) states.

When the vehicular information terminal 100 calls for a connectable one of the BT modules with the aid of a Paging message (accordingly, the vehicular information terminal 100 serves as a master) and the mobile telephone 12 responds to the Paging message, a Piconet is formed (the mobile telephone 12 serves as a slave). Thus, communication through BT is possible thereafter. If several occupants in the vehicle have mobile telephones 12, the vehicular information terminal 100 is able to communicate with each mobile telephone 12.

Further, in BT, profiles are determined such that the respective components can communicate with one another. The BT modules 24, 19 are equipped with the same profile and thereby ensured of mutual connection. As the profiles, various profiles such as a generic access profile (GAP) prescribing a basic condition for BT connection, a service discovery application profile (SAD) for finding an available service, a serial port profile (SPP) prescribing a condition in emulating serial communication, and the like are prescribed.

In order to implement hands-free operation, it is recommended to mount a hands-free profile (HFP). The HFP prescribes the input/output of a speech, the handling of an AT command, the transmission of the intensity of electric waves, the notification of a number of a caller, and the like, the utilization of redial and a telephone directory function, echo cancellation, and the like. Further, when an object push profile (OPP) is mounted, the telephone directory data 30 on the telephone directory "A" can be transferred from the mobile telephone 12 to the vehicular information terminal 100. Further, when a phone book access profile (PBAP) is mounted, the telephone directory "A" can be transferred from the mobile telephone 12 to the vehicular information terminal 100 omitting a predetermined operation. When the PBAP is not mounted, the user operates the mobile telephone 12 to transfer one record in the stored telephone directory "A" after another or the entire telephone directory "A" at a time. It is also appropriate to directly operate the vehicular information terminal 100 to input the telephone numbers, names, and the like in the telephone directory one by one. Communication through BT is no more than an example, and it is also appropriate to establish connection through wireless communication such as ZIGBEE (registered trademark), ultra-wideband (UWB), or the like, or through a wire.

The vehicular information terminal 100 is often integrated with a navigation system. Thus, it is possible to save an on-vehicle space and restrain the weight of the vehicle from increasing. Accordingly, the vehicular information terminal 100 is, for example, a navigation electronic control unit (ECU). The vehicular information terminal 100 is connected to a GPS receiver 21 and a vehicle speed sensor 22 via an in-vehicle LAN such as a controller area network (CAN) or the like, and has a map DB 23.

The GPS receiver 21 detects position information on the vehicle based on an arrival time of electric waves received from a GPS satellite. Further, the vehicle speed sensor 22 detects rotational speed information on respective wheels of the vehicle. The vehicular information terminal 100 accumulates a running distance output by the vehicle speed sensor 22 on the position information to estimate a position of the vehicle. The vehicular information terminal 100 then reads out from the map DB 23 road map information around the position of the vehicle, and displays on the display device 27 the road map information together with an icon indicating the position of the vehicle. The road map information stored in the map DB 23 may be downloaded from a server and mounted in the map DB 23.

Registration of the telephone directory "A" will be described. First of all, the user registers the telephone directory data 30 on the telephone directory "A" of the mobile telephone 12 into the vehicular information terminal 100. At the time of this registration, the link table 20 is generated. FIG. 3 is an example of a functional block diagram of the vehicular information terminal 100 according to the second embodiment of the invention. Respective blocks of FIG. 3 are implemented through the execution of a program stored in the memory 26 by the CPU 25 or through a piece of hardware such as an application specific integrated circuit (ASIC).

When the user carrying the mobile telephone 12 gets into the vehicle and a Piconet is formed, the individual identification number of the mobile telephone 12 is automatically sent to the vehicular information terminal 100. However, the telephone number is not always automatically sent. When the telephone number is not sent, the link table generation portion 41 requests the mobile telephone 12 to send the telephone number. The mobile telephone 12 acquires permission of the user or automatically sends the telephone number to the vehicular information terminal 100. The link table generation portion 41 may display "Please input the telephone number of the mobile telephone." on the display device 27 to urge the user to input the telephone number.

Further, the user transfers the telephone directory data 30 on the telephone directory to the vehicular information terminal 100. The action of transferring the telephone directory data 30 may be taken proactively by the user or passively. For example, when the PBAP is mounted, it is possible to request the mobile telephone 12 to transfer the telephone directory data 30 from the vehicular information terminal 100. In this case, the user may easily transfer the telephone directory data 30 by performing a minimum operation such as the permission of the transfer or the like.

When the telephone directory data 30 are transferred, the link table generation portion 41 registers association information into the link table 20 to link the telephone directory data 30 with the received telephone number and the received individual identification number. FIG. 4A is a diagram showing an example of the link table 20. Identification information on a telephone directory called the telephone directory "A" (actually identification information on the telephone directory data 30) is associated with the telephone number and the individual identification number. In this embodiment of the invention, the identification information of this telephone directory is defined as association information. However, at least one of the telephone number and the individual identification number may be defined as association information. Information such as addresses, postal codes, notes, and the like, as well as telephone numbers and names are included in the telephone directory data 30.

Next, authentication of the mobile telephone 12 will be described. Returning to FIG. 3, the authentication portion 42 compares the telephone number sent from the mobile telephone 12 with the telephone number stored in the link table 20, and determines that the mobile telephone 12 is authenticated if both the telephone number is the same. If the mobile telephone 12 is authenticated, the authentication portion 42 sends authentication OK signal to a telephone directory display portion 45. If the mobile telephone 12 is not authenticated, the authentication portion 42 sends a deletion request to an association deletion portion 43 and a telephone directory deletion portion 44. If the telephone numbers do not coincide with each other, the authentication portion 42 compares the individual identification number sent from the mobile telephone 12 with the individual identification number stored in the link table 20.

The telephone directory display portion 45 reads out from the memory 26 the telephone directory data 30 that is is associated with the telephone number, and displays the data on the display device 27 only after it has received the authentication OK signal. Accordingly, if the telephone numbers coincide with each other, the user can access the telephone directory data 30, for example, to browse the telephone directory data 30 or to select a destination.

When the telephone directory deletion portion 44 receives a request for deletion from the authentication portion 42 the specified telephone directory data 30 is deleted from the memory 26. In the case where the telephone directory "A" is deleted, even when only the association information is stored in the link table 20, the telephone directory data 30 cannot be accessed. Therefore, the telephone directory deletion portion 44 deletes the association information in the link table 20.

When the association deletion portion 43 receives a request for deletion from the authentication portion 42, the specified association information is deleted from the link table 20. FIG. 4B shows an example of the link table 20 whose association information has been deleted. Thus, access to the telephone directory data 30 is prevented even when the link table 20 is referred to, without deleting the telephone directory data 30. The deletion of the telephone directory data 30 or the deletion of the association information from the link table 20 may be set by the user. That is, a user desiring to utilize the telephone directory data 30 of his or her own later can make the setting so as to delete only the association information, and a user desiring to ensure security can make the setting so as to delete the telephone directory data 30.

Figure 5:
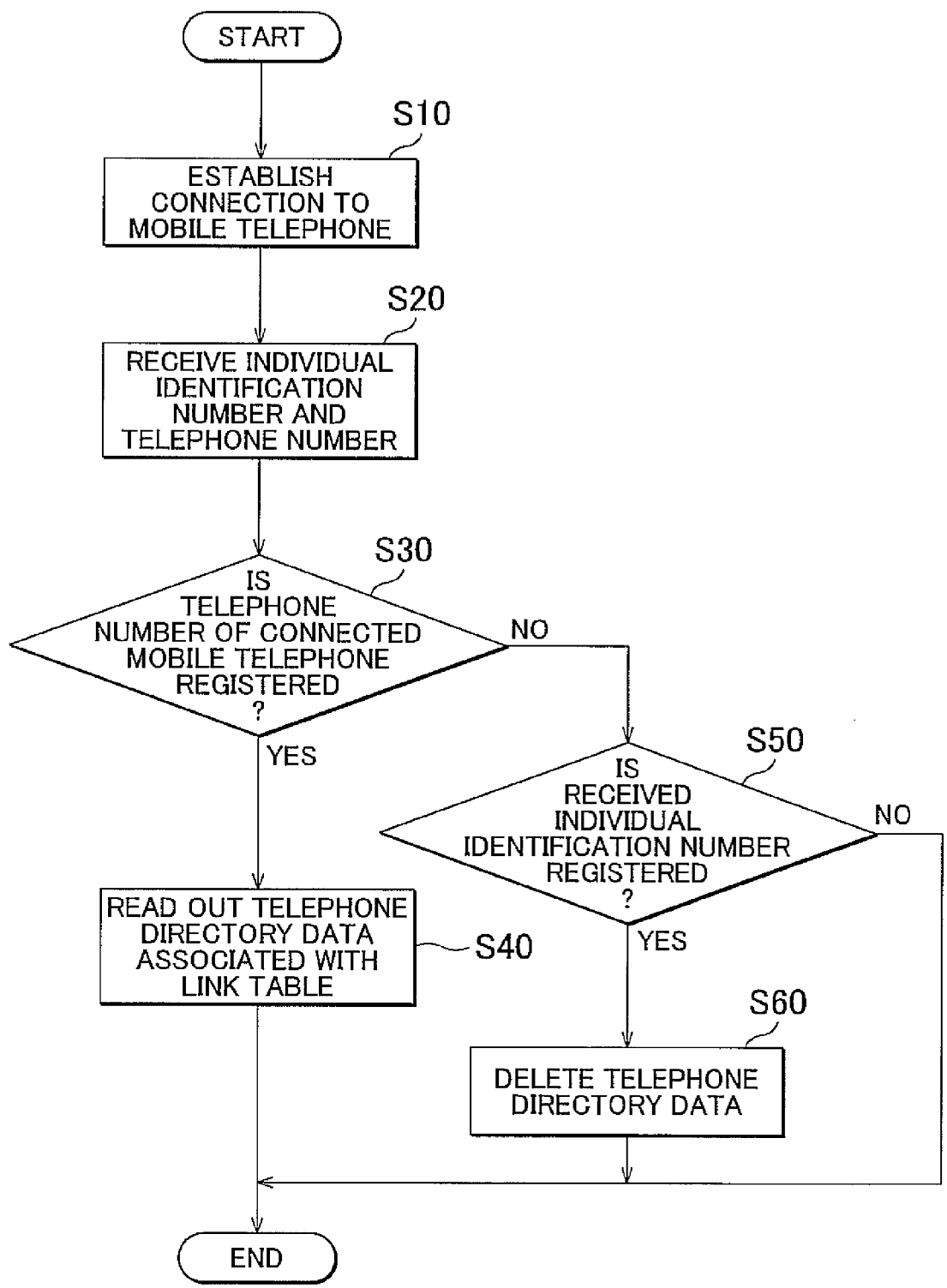
FIG. 5 is a flowchart showing a procedure in which the vehicular information terminal according to the second embodiment of the invention authenticates a mobile telephone.

Next, the operating procedure of the vehicular information terminal 100 will be described. A procedure in which the vehicular information terminal 100 authenticates the mobile telephone 12 will be described based on the flowchart of FIG. 5. In FIG. 5, it is assumed that two telephone directories, namely, the telephone directory "A" and a telephone directory Z are registered in advance as shown in FIG. 4C. The telephone directory data 30 in telephone directory Z are transferred from the telephone directory Z of a mobile telephone 12Z by, for example, a user Z. Further, in the process of FIG. 5, the telephone directory data 30 are deleted if the mobile telephone 12Z cannot be authenticated.

When the mobile telephone 12 enters a range allowing communication, the vehicular information terminal 100 and the mobile telephone 12 are connected to each other (S10), and the vehicular information terminal 100 receives an individual identification number and a telephone number (S20). The following description will be given citing some situations shown in FIG. 1 as examples.

First of all, in the case of the mobile telephone 12A (the individual identification number 123) and the IC card A (the telephone number "090-1234-5678") (see the upper right diagram in FIG. 1), the telephone number stored in the link table 20 coincides with the telephone number received from the mobile telephone 12A. Therefore, the authentication portion 42 authenticates the mobile telephone 12A (Yes in S30). Accordingly, the telephone directory display portion 45 reads out from the memory 26 the telephone directory data 30 in telephone directory "A", which is associated with the received telephone number, and displays the telephone directory data 30 from telephone directory "A" on the display device 27 through, for example, the operation by the user (S40).

If the telephone number cannot be received due to a communication failure of the BT module 24 or the like, the authentication portion 42 determines that the mobile telephone 12A is authenticated. Thus, the telephone directory data 30 can be displayed despite the occurrence of the communication failure, and the convenience for the user can be enhanced.

Next, a case of the mobile telephone 12B (the individual identification number 456) and the IC card A (the telephone number "090-1234-5678") (see the diagram on the lower right of FIG. 1), namely, a case where the user A has changed the model of the mobile telephone from the mobile telephone 12A to the mobile telephone 12B without changing the telephone number will be described. In this case, since the telephone number has not been changed, the process of operating the vehicular information terminal 100 is the same. That is, because the telephone number stored in the link table 20 coincides with the telephone number received from the mobile telephone 12B, the authentication portion 42 determines that the mobile telephone 12B is authenticated (Yes in S30). Accordingly, the telephone directory display portion 45 reads out the telephone directory data 30 in telephone directory "A" from the memory 26, and displays the telephone directory data 30 on the display device 27 through, for example, the operation of the user (S40).

That is, even after having changed the mobile telephone handset, user A may use the telephone directory "A" without transferring the telephone directory data 30 again.

Next, a case of the mobile telephone 12A (the individual identification number 123) and the IC card B (the telephone number "080-1234-5678") (see the diagram on the lower left of FIG. 1), namely, a case where the user A has handed over the mobile telephone 12A to the user B and the user B has fitted into the mobile telephone 12A the IC card B in which a unique telephone number is stored, will be described.

In this case, the telephone number stored in the link table 20 does not coincide with the telephone number received from the mobile telephone 12A (No in S30). If the telephone numbers do not coincide with each other, it is then still impossible to determine whether the user B carries the mobile telephone 12A or a completely different mobile telephone 12 that is not registered in the vehicular information terminal 100. Thus, the authentication portion 42 determines whether or not the received individual identification number is stored in the link table 20 (S50).

Since the individual identification number 123 is registered in the link table 20, the result of step S50 is Yes. In this case, due to the fact that the telephone number is different, it is appropriate to consider that the mobile telephone 12A has been handed over to someone else, namely, the user B. Therefore, the telephone directory deletion portion 44 deletes the telephone directory data 30 on the telephone directory "A" (S60). Accordingly, even if user B has the mobile telephone 12A whose individual identification number is coincident, that piece of the telephone directory data 30 on the telephone directory "A" which is associated with the telephone number "090-1234-5678" is deleted. Therefore, security can be ensured, and the capacity of the memory can be saved. Further, the received individual identification number and the individual identification number of the link table 20 as well as the telephone numbers are compared with each other. Therefore, there is no possibility of the telephone directory data 30 on a telephone directory Z registered by a completely different user Z being deleted.

In FIG. 5, the telephone directory is deleted when the mobile telephone is not authenticated. However, it is also possible to delete from the link table 20 association information that associates the telephone number of the mobile telephone 12A and the individual identification number thereof with the telephone directory data 30 on the telephone directory "A". In this case, the telephone directory data 30 on the telephone directory "A" are not deleted. Therefore, when the user A gets into the vehicle at a later date, the vehicular information terminal 100 can regenerate the association information in the link table 20. The operating process is performed simply by changing step S60 of FIG. 5 to "DELETE ASSOCIATION INFORMATION FROM LINK TABLE", and hence will not be described hereinafter.

Accordingly, after the user B with "the mobile telephone 12A (the individual identification number 123) and the IC card B (the telephone number "080-1234-5678") gets into the vehicle, association information that links the telephone directory data 30 in the telephone directory "A" with the mobile telephone 12A is deleted in the link table 20, as shown in FIG. 4D.

Figure 6:
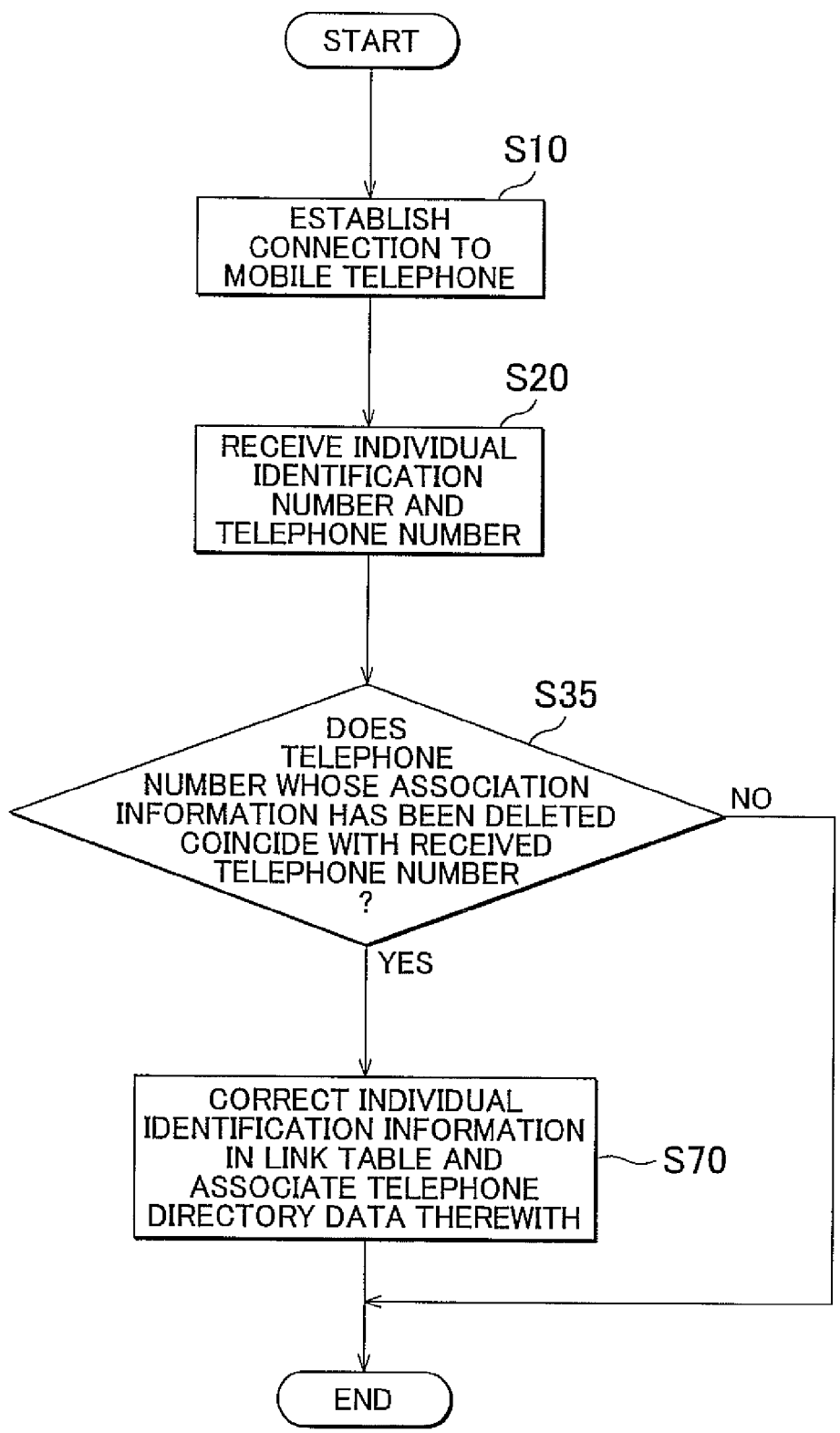
FIG. 6 is a flowchart showing the process of regenerating a link table according to the second embodiment of the invention.

FIG. 6 is a flowchart showing the process of regenerating the link table 20. The flowchart of FIG. 6 is started only if the link table 20 whose association information has been deleted is stored. The user A has, for example, changed the model of the mobile telephone. Therefore, the user A carries the mobile telephone 12B with "the mobile telephone 12B (the individual identification number 456) and the IC card A (the telephone number "090-1234-5678")".

When the mobile telephone 12B enters a range allowing communication, the vehicular information terminal 100 and the mobile telephone 12B are connected to each other (S10), and the vehicular information terminal 100 receives the individual identification number and the telephone number (S20).

The authentication portion 42 determines whether one of the telephone numbers registered in the link table 20 whose association information has been deleted coincides with the telephone number received from the mobile telephone 12B (S35). If the result of S35 is Yes, this embodiment of the invention determines that the user A who has handed over the mobile telephone 12A is aboard the vehicle, and the link table generation portion 41 changes the individual identification number of the link table 20 from "123" to "456", and registers the telephone directory data 30 in the telephone directory "A" into the link table 20 (S70). If the telephone directory "A" is saved before deleting association information, the appropriateness of associating the telephone directory "A" based on the received telephone number is understood.

After that, the process of FIG. 5 is carried out and the mobile phone 12B is thereby authenticated. Therefore, the link table 20 is referred to, and the user A can access the telephone directory data 30 on the telephone directory "A" that have been transferred by the user A. Accordingly, even when the user A has handed over the mobile phone 12A to the user B and association information is deleted from the link table 20 due to the boarding of the user B, the link table 20 may be regenerated. Therefore, the user A may access the telephone directory data 30 in the telephone directory "A" without transferring the telephone directory data 30 on the telephone directory "A" again.

As described above, the vehicular information terminal 100 according to the second embodiment of the invention deletes the associated telephone directory data 30 if the telephone numbers do not coincide with each other, thereby making it possible to save the capacity of the memory 26 and realize reliable security. Further, if the association information is deleted from the link table 20, the link table 20 may be regenerated at a later time while ensuring security.

In the third embodiment of the invention, the vehicular information terminal 100 whose application range is wider as to the situation in which the mobile telephone 12 is used, for example, the change of the model of the mobile telephone. If user A selectively uses two mobile telephones 12A1 and 12A2, this embodiment of the invention makes it possible to ensure the security of the telephone directory "A" and restrain the telephone directory data 30 from being transferred. Therefore, the convenient vehicular information terminal 100 can be provided.

Figure 7:
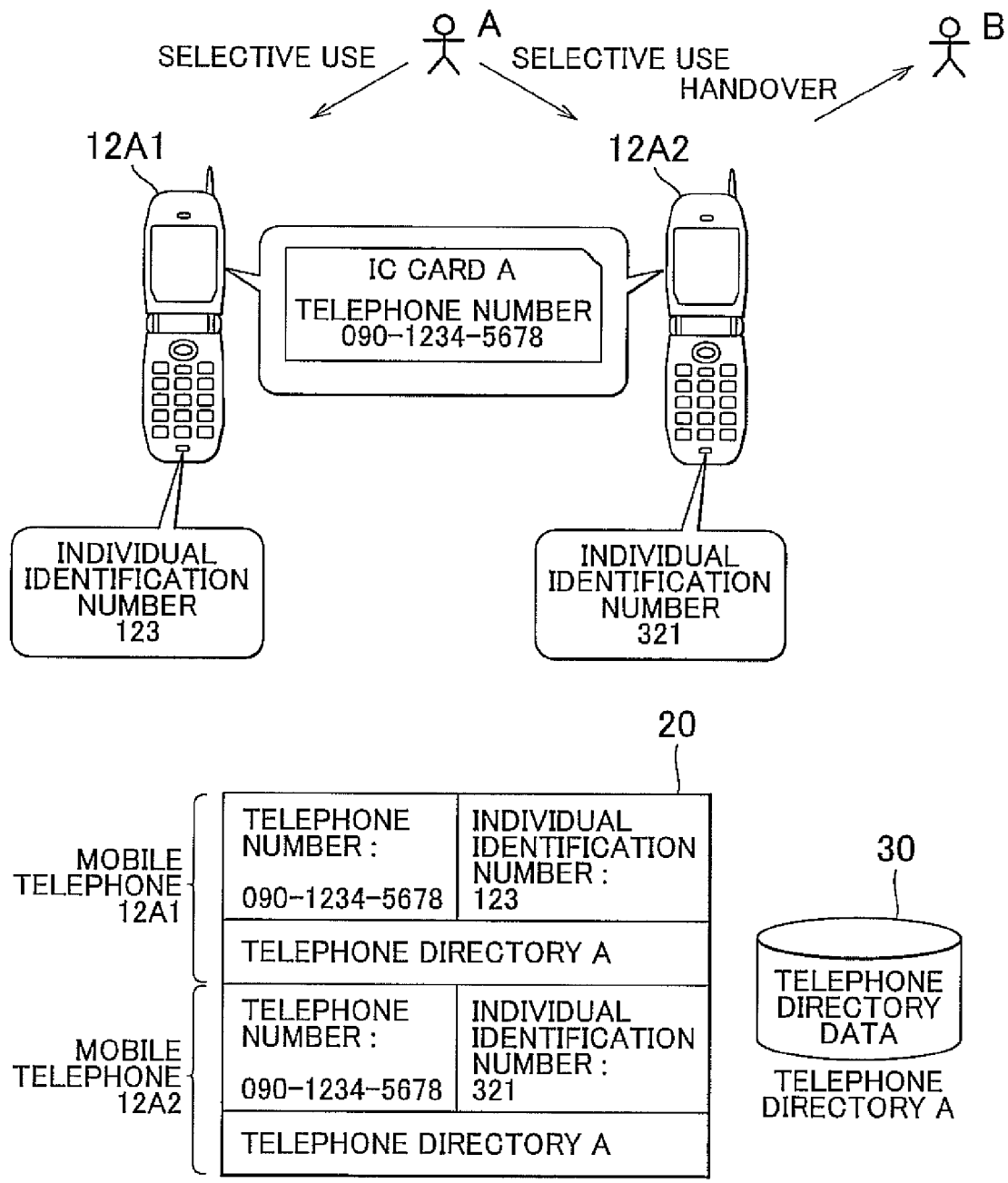
FIG. 7 is a diagram showing an example of mobile telephones carried by a user and a link table according to the third embodiment of the invention.

FIG. 7 shows an example of the mobile telephones 12A1 and 12A2 carried by the user A and the link table 20. The user A selectively uses the mobile telephones 12A1 and 12A2 with the same telephone number "090-1234-5678". Even though the two mobile telephones 12A1 and 12A2 are used, the telephone directory "A" used by the user A is considered to be common to both the mobile telephones. In this case, it is conceivable to store the telephone directory data 30 on the telephone directory "A" in association with the mobile telephones 12A1 and 12A2 respectively (the same telephone directory data 30 are stored twice) or to store the telephone directory data 30 on the telephone directory "A" only once. Although this embodiment of the invention is compatible with either case, the memory 26 can be saved by storing the same telephone directory data 30 only once. Then, in the link table 20 according to this embodiment of the invention, the same telephone directory "A" is associated with the mobile telephones 12A1 and 12A2.

As in the case where the user has given the mobile telephone handset to someone else in the second embodiment of the invention, consideration will be given to a case where the user A has handed over one of the mobile telephones 12A2 to the user B. When the user B gets into the vehicle with the IC card B fitted in the mobile telephone 12A2, the vehicular information terminal 100 either deletes the telephone directory data 30 on the telephone directory "A" or deletes association information from the link table 20 in the second embodiment of the invention. However, if the telephone directory data 30 in the telephone directory "A" are deleted in the third embodiment of the invention, user A will not be able to access the telephone directory data 30 on the telephone directory "A" after having got into the vehicle carrying the mobile telephone 12A1 that has not been handed over.

Thus, in this embodiment of the invention, if the same telephone number is registered in the link table 20, only the information associating the received individual identification number with the telephone directory data 30 is deleted, without deleting the telephone directory data 30 associated with the registered telephone number in the telephone directory "A". The association information on the mobile telephone 12A1 that has not been handed over and the telephone directory data 30 can remain stored. Therefore, having got into the vehicle, the user A can access the telephone directory data 30 on the telephone directory "A" without performing any new operation.

FIG. 8 is a flowchart showing a procedure in which the vehicular information terminal 100 authenticates the mobile telephone 12 in the third embodiment of the invention. Among the situations illustrated in the second embodiment of the invention, the case where the user A has got into the vehicle carrying the mobile telephone 12A1 with "the mobile telephone 12A1 (the individual identification number 123) and the IC card A (the telephone number "090-1234-5678")" and the case where the user A has got into the vehicle carrying the mobile telephone 12B with "the mobile telephone 12B (the individual identification number 456) and the IC card A (the telephone number "090-1234-5678")" (has changed the model of the mobile telephone) are the same as in the second embodiment of the invention.

Now a case where the user A has handed over the mobile telephone 12A2 to the user B and the user B has fitted into the mobile telephone 12A2 the IC card B with the unique telephone number stored therein when the user B gets into the vehicle carrying the mobile telephone 12A2 with "the mobile telephone 12A2 (the individual identification number 321) and the IC card B (the telephone number "080-1234-5678")" will be described.

When the mobile telephone 12A2 enters a range allowing communication, the vehicular information terminal 100 and the mobile telephone 12A2 are connected to each other (S10), and the vehicular information terminal 100 receives the individual identification number and the telephone number (S20).

The telephone number stored in the link table 20 does not coincide with the telephone number received from the mobile telephone 12A2 (No in S30). Thus, the authentication portion 42 determines whether the received individual identification number is stored in the link table 20 (S50). If the received individual identification number is stored, the authentication portion 42 determines whether the telephone directory "A" associated with the received individual identification number is associated with the other mobile telephone 12A1 (the telephone number and the individual identification number) (S110). The telephone directory associated with the individual identification number "321" is the telephone directory "A", but the other mobile telephone 12A1 is associated with the telephone directory "A". That is, in this case, it is inappropriate to delete the telephone directory data 30 on the telephone directory "A". Therefore, the association deletion portion 43 deletes association information in accordance with the individual identification number "321" from the link table 20 (S120).

Further, if the telephone directory "A" is not associated with the other mobile telephone 12A1 (No in S110), it is determined that user A has not selectively used the mobile telephones 12A1 and 12A2. Then, as in the case of the second embodiment of the invention, the telephone directory deletion portion 44 deletes the telephone directory data 30 in the telephone directory "A", or the association deletion portion 43 deletes association information from the link table 20 (S60).

Accordingly, in this embodiment of the invention, in addition to the effect of the second embodiment of the invention, when (the telephone number and individual identification number of) the other mobile telephone 12 is associated with the telephone directory, a deterioration in convenience can be prevented only by deleting the association information. Further, if the telephone number and individual identification number of the other mobile telephone 12 is not linked with the telephone directory, the telephone directory data 30 on the telephone directory are deleted. Therefore, it is possible to ensure security and save the capacity of the memory.

While the invention has been described with reference to the example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A hands-free system that stores therein terminal memory data transferred from a storage memory of a mobile terminal and permits access to the terminal memory data when the mobile terminal is identified through predetermined identification information, the hands-free system comprising:
   a storage portion that stores therein the terminal memory data stored in the memory of the mobile terminal in association with first identification information and second identification information;
   a receiving portion that receives first identification information and second identification information from the mobile terminal;
   a collation portion that collates first received identification information as the first identification information that has been received and first stored identification information as the first identification information stored in the storage portion with each other and collates second received identification information as the second identification information that has been received and second stored identification information as the second identification information stored in the storage portion with each other; and
   a terminal memory data deletion portion that deletes the terminal memory data stored in association with the second stored identification information when it is determined that the first received identification information and the first stored identification information cannot be collated with each other and that the second received identification information and the second stored identification information can be collated with each other.

2. The hands-free system according to claim 1, wherein the first identification information is identification information on a user of the mobile terminal, and the second identification information is identification information on the mobile terminal.

3. The hands-free system according to claim 1, further comprising an association deletion portion that deletes association information associating the second stored identification information with the terminal memory data when the terminal memory data deletion portion deletes the terminal memory data stored in association with the second stored identification information.

4. The hands-free system according to claim 1, wherein the collation portion determines whether the terminal memory data associated with the second stored identification information are associated with first stored identification information and second stored identification information other than the first stored identification information and the second stored identification information that have been collated with each other when it is determined that the first received identification information and the first stored identification information cannot be collated with each other and the second received identification information and the second stored identification information can be collated with each other, and the terminal memory data deletion portion deletes the terminal memory data stored in association with the second stored identification information that has been collated only when the terminal memory data are not associated with the first stored identification information and the second stored identification information other than the first stored identification information and the second stored identification information that have been collated with each other.

5. The hands-free system according to claim 1, wherein the collation portion determines whether the terminal memory data associated with the second stored identification information are associated with first stored identification information and second stored identification information other than the first stored identification information and the second stored identification information that have been collated with each other when it is determined that the first received identification information and the first stored identification information cannot be collated with each other and that the second received identification information and the second stored identification information can be collated with each other,
   the hands-free system further comprising association deletion portion that deletes association information associating the second stored identification information that has been collated with the terminal memory data when the terminal memory data are associated with the first stored identification information and the second stored identification information other than the first stored identification information and the second stored identification information that have been collated with each other.

6. The hands-free system according to claim 1, further comprising an association deletion portion that deletes association information associating the second stored identification information with the terminal memory data instead of deleting the terminal memory data associated with the second stored identification information by the terminal memory data deletion portion.

7. The hands-free system according to claim 6, wherein
   the receiving portion receives first identification information and second identification information from the mobile terminal after the association information is deleted by the association deletion portion,
   the collation portion collates the first stored identification information, which is associated with the terminal memory data whose association information has been deleted by the association deletion portion, and the first received identification information as the first identification information that has been received with each other, and
   the storage portion stores therein association between the received second identification information and the terminal memory data when it is determined that the first received identification information and the first stored identification information can be collated with each other.

8. The hands-free system according to claim 1, wherein the first identification information is a telephone number, and the second identification information is an individual identification number that uniquely specifies the mobile terminal.

9. The hands-free system according to claim 1, wherein the collation portion determines that the first received identification information and the first stored identification information can be collated with each other when the receiving portion cannot receive at least first identification information from the mobile terminal.

10. A hands-free system that stores therein terminal memory data transferred from a mobile terminal and permits access to the terminal memory data when the mobile terminal is identified through predetermined identification information, the hands-free system comprising:
    a storage portion that stores therein the terminal memory data stored in a memory of the mobile terminal in association with first identification information and second identification information;
    a receiving portion that receives first identification information and second identification information from the mobile terminal;

a collation portion that that collates first received identification information as the first identification information that has been received and first stored identification information as the first identification information stored in the storage portion with each other and collates second received identification information as the second identification information that has been received and second stored identification information as the second identification information stored in the storage portion with each other; and a terminal memory data deletion portion that deletes the terminal memory data associated with the first stored identification information and the second stored identification information when it is determined that the first received identification information and the first stored identification information cannot be collated with each other and that the second received identification information and the second stored identification information can be collated with each other.

11. The hands-free system according to claim 10, wherein the first identification information is identification information on a user of the mobile terminal, and the second identification information is identification information on the mobile terminal.

12. The hands-free system according to claim 10, wherein the first identification information is a telephone number, and the second identification information is an individual identification number that uniquely specifies the mobile terminal.

13. A navigation system comprising:
the hands-free system according to claim 1;
a position detection portion that detects position information on a vehicle; and
a display portion that displays a position of the vehicle on a road map.

14. A navigation system comprising:
the hands-free system according to claim 10;
a position detection portion that detects position information on a vehicle; and
a display portion that displays a position of the vehicle on a road map.

15. A terminal memory data management method in a hands-free system that stores therein terminal memory data transferred from a mobile terminal and permits access to the terminal memory data when the mobile terminal is identified through predetermined identification information, the data management method comprising:

storing in advance into a storage portion of the hands-free system the terminal memory data stored in a memory of the mobile terminal in association with first identification information and second identification information;

receiving first identification information and second identification information from the mobile terminal by a receiving portion of the hands-free system;

collating first received identification information as the first identification information that has been received and first stored identification information as the first identification information stored in the storage portion with each other and collating second received identification information as the second identification information that has been received and second stored identification information as the second identification information stored in the storage portion with each other by a collation portion of the hands-free system; and deleting the terminal memory data associated with the first stored identification information and the second stored identification information when it is determined that the first received identification information and the first stored identification information cannot be collated with each other and that the second received identification information and the second stored identification information can be collated with each other, by a terminal memory data deletion portion of the hands-free system.

16. The terminal memory data management method according to claim 15, wherein the first identification information is identification information on a user of the mobile terminal, and the second identification information is identification information on the mobile terminal.

17. The terminal memory data management method according to claim 15, wherein the first identification information is a telephone number, and the second identification information is an individual identification number that uniquely specifies the mobile terminal.

* * * * *